US008898107B1

(12) United States Patent
Floyd et al.

(10) Patent No.: US 8,898,107 B1
(45) Date of Patent: *Nov. 25, 2014

(54) MANAGING DEDUPLICATION OF STORED DATA

(71) Applicant: Permabit Technology Corp., Cambridge, MA (US)

(72) Inventors: Jered J. Floyd, Somerville, MA (US); Michael Fortson, Cambridge, MA (US); Assar Westerlund, Somerville, MA (US); Jonathan Coburn, Cambridge, MA (US)

(73) Assignee: Permabit Technology Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,558

(22) Filed: May 6, 2013

Related U.S. Application Data

(63) Continuation of application No. 13/117,629, filed on May 27, 2011, now Pat. No. 8,463,742.

(60) Provisional application No. 61/384,212, filed on Sep. 17, 2010.

(51) Int. Cl.
*G06F 17/30* (2006.01)

(52) U.S. Cl.
CPC ............................. *G06F 17/30156* (2013.01)
USPC ........................................ 707/609; 707/742

(58) Field of Classification Search
USPC .................................................. 707/609, 742
See application file for complete search history.

(56) References Cited

U.S. PATENT DOCUMENTS

| 6,976,060 | B2 * | 12/2005 | Manczak et al. | 709/219 |
| 7,457,813 | B2 | 11/2008 | Margolus et al. | |
| 7,567,188 | B1 * | 7/2009 | Anglin et al. | 341/63 |
| 2002/0161855 | A1 * | 10/2002 | Manczak et al. | 709/219 |
| 2007/0067325 | A1 * | 3/2007 | Weitzner et al. | 707/101 |
| 2008/0082554 | A1 * | 4/2008 | Pedersen | 707/100 |
| 2009/0112945 | A1 * | 4/2009 | Camble et al. | 707/204 |
| 2010/0118039 | A1 * | 5/2010 | Labour | 345/522 |
| 2011/0238635 | A1 * | 9/2011 | Leppard | 707/693 |

OTHER PUBLICATIONS

Alvarez, Carlos, "NetApp Deduplication for FAS and V-Series Deployment and Implementation Guide (Technical Report)," Jan. 2010, TR-3505, Rev. 7, 46 pages.

* cited by examiner

*Primary Examiner* — Kim Nguyen
(74) *Attorney, Agent, or Firm* — Fish & Richardson P.C.

(57) ABSTRACT

In one aspect, in general, a method for managing data in a data storage system comprises receiving data to be stored in the data storage system, computing values corresponding to different respective portions of the received data, generating identifiers corresponding to different respective portions of the received data, with an identifier corresponding to a particular portion of data including the computed value corresponding to the particular portion of data and metadata indicating a location where the particular portion of data is being stored in the data storage system, and storing at least some of the identifiers in an index until the index reaches a predetermined size.

40 Claims, 8 Drawing Sheets

| Time | Action | Inode #1 Metadata |
|---|---|---|
| T=0 | File "/foo" created, stored at inode #1. | Dirty? Y / Gen 1 |
| T=1 | File "/foo" scanned by Albireo | Dirty? N / Gen 1 |
| T=2 | File "/bar" is scanned, Deduplication engine reports: "This file shares a chunk with inode #1 with gen 1". Advice may be taken | |
| T=3 | "/foo" is updated | Dirty? Y / Gen 2 |
| T=4 | File "/baz" is scanned; Engine reports: "File shares a segment with inode #1 with gen 1". Stale advice. Perform compare/update mapping. | |
| T=5 | "/foo is rescanned | Dirty? N / Gen 2 |

MANAGING DEDUPLICATION OF STORED DATA

CLAIM OF PRIORITY

This application claims priority under 35 USC §120 to U.S. patent application Ser. No. 13/117,629, filed on May 27, 2011, which claims priority to U.S. Patent Application Ser. No. 61/384,212, filed on Sep. 17, 2010, the entire contents of which are both hereby incorporated by reference.

BACKGROUND

This description relates to managing deduplication of stored data.

Some data storage systems are configured to include a deduplication function that is used to reduce the amount of storage capacity that is needed to store received data (e.g., data to be archived in the data storage system). In some implementations, deduplication works by segmenting received data into segments (also called "chunks" of data) that are identified in an index by a value, such as a cryptographic hash value. A form of data compression can be achieved by preventing duplicate segments from being stored when the data is being stored in the data storage system. For example, a given file (made up of one or more segments) that has already been stored (e.g., an email attachment attached to multiple emails in an email storage system) can simply be replaced with a reference to the previously stored file if the previously stored file has the same segments. Alternatively, a given segment within a given file that is the same as another segment in the given file or another file (e.g., a portion of document within a ZIP archive that is also stored in another ZIP archive) can be replaced with a reference to the duplicate segment.

SUMMARY

In one aspect, in general, a method for managing data in a data storage system comprises receiving data to be stored in the data storage system, computing values corresponding to different respective portions of the received data, generating identifiers corresponding to different respective portions of the received data, with an identifier corresponding to a particular portion of data including the computed value corresponding to the particular portion of data and metadata indicating a location where the particular portion of data is being stored in the data storage system, and storing at least some of the identifiers in an index until the index reaches a predetermined size.

In another aspect, in general, a method for managing data in a data storage system comprises receiving data to be stored in the data storage system, computing values corresponding to different respective portions of the received data, generating identifiers corresponding to different respective portions of the received data, with an identifier corresponding to a particular portion of data including the computed value corresponding to the particular portion of data and metadata indicating a location where the particular portion of data is being stored in the data storage system, storing at least some of the identifiers in an index until the index reaches a predetermined size; and in response to determining that a first identifier corresponding to a first portion of data, received after the index reached the predetermined size, was not already stored in the index before the first portion of data was received, storing the first identifier in the index and designating for removal at least a second identifier corresponding to a second portion of data to be removed from the index such that the index does not exceed the predetermined size.

Aspects can include one or more of the following features.

The method further comprises, in response to determining that the first identifier was not already stored in the index before the first portion of data was received, storing the first portion of data in the data storage system.

The method further comprises determining logical boundaries corresponding to the different respective portions of the received data.

The method further comprises determining a domain corresponding to a section of a file system including the particular portion of data being stored in the data storage system.

The method further comprises determining a first domain corresponding to first one or more respective portions of the data being stored in the data storage system and a second domain corresponding to a second, different one or more respective portion of the data being stored in the data storage system.

The method further comprises executing deduplication for data segments of the received data such that data segments belonging to the first domain is not deduplicated with data segments belong to the second domain. The method further comprises determining a domain tag to reference the domain. In some examples, the domain tag comprises a namespace.

Designating for removal at least a second identifier from the index comprises designating for removal one or more identifiers based at least in part on an order in which identifiers were added to or updated in the index.

The one or more identifiers selected to be removed are the identifiers that have been least recently added to or updated in the index.

The method further comprises, in response to determining that a third identifier corresponding to a third portion of the received data was already stored in the index before the third portion of data was received, updating the third identifier in the index.

Updating the third identifier in the index comprises updating an order of the third identifier relative to other identifiers in the index.

Updating the order comprises updating a timestamp associated with the third identifier.

Updating the order comprises updating a position of an entry storing the third identifier within the index.

The method further comprises, in response to determining that the third identifier was already stored in the index before the third portion of data was received, associating a first data structure representing data that included the third portion of data with a duplicate of the third portion of data that was already stored in the data storage system before the third portion of data was received.

Associating the first data structure with the duplicate of the third portion of data comprises storing a reference to the duplicate of the third portion of data in a data structure that is separate from the index.

The data structure that is separate from the index comprises the first data structure.

The method further comprises segmenting the received data into the different respective portions.

The sizes of at least some of the portions of data are different.

The data that included the third portion of data is a file included in the received data, and the third portion of data is a segment of the file.

The data structure is a data structure representing the file.

The index includes multiple entries, each entry storing one of the computed values and a reference to the portion of data corresponding to the computed value stored in the entry.

Computing values corresponding to different respective portions of the received data comprises: computing unique values that uniquely identify different respective portions of the received data; and using at least part of a unique value that uniquely identifies a particular portion of the received data as the computed value corresponding to the particular portion of the received data.

The unique values are hash values computed from the respective portions of the received data using a hash function.

The data storage system comprises one or more storage media coupled to a computing system that receives the data to be stored in the data storage system.

The data storage system is coupled to the computing system over a network.

The data storage system further comprises an application that manages data stored in the one or more storage media.

The application executes on the computing system.

The application uses an application programming interface to access one or more functions that compute the values corresponding to different respective portions of the received data and manage the index including determining whether particular identifiers are stored in the index.

The index includes at least one portion stored in multiple locations.

At least one of the locations comprises a volatile storage medium, and at least one of the locations comprises a non-volatile storage medium.

The method further comprises, in response to removing a particular portion of data from the data storage system, removing the identifier corresponding to the particular portion of data from the index.

The method further comprises, in response to modifying a particular portion of data in the data storage system, removing the identifier corresponding to the unmodified particular portion of data from the index and adding a new identifier corresponding to the modified particular portion of data.

The method further comprises determining different levels of abstractions corresponding to the received data for referencing the different respective portions of the received data. The different levels of abstractions include virtual segments and physical segments, the virtual segments being based in part on virtual memory addresses and the physical segments based in part on physical memory addresses. A first level of abstraction corresponding to the received data references a second level of abstraction of the received data. The method comprises causing a software layer to define the different levels of abstractions. The method comprises sending data regarding a new data segment to a deduplication engine, receiving deduplication advice from the engine, and based on the advice, reallocating one or more physical segments from corresponding one or more virtual segments to different respective one or more virtual segments.

In another aspect, in general, a computer-readable storage medium stores a computer program for managing data in a data storage system. The computer program includes instructions for causing a computing system to: receive data to be stored in the data storage system; compute values corresponding to different respective portions of the received data; generate identifiers corresponding to different respective portions of the received data, with an identifier corresponding to a particular portion of data including the computed value corresponding to the particular portion of data and metadata indicating a location where the particular portion of data is being stored in the data storage system; store at least some of the identifiers in an index until the index reaches a predetermined size; and in response to determining that a first identifier corresponding to a first portion of data, received after the index reached the predetermined size, was not already stored in the index before the first portion of data was received, store the first identifier in the index and select at least a second identifier corresponding to a second portion of data to be removed from the index such that the index does not exceed the predetermined size.

In another aspect, in general, a system for managing data comprises: a data storage system; and a computing system. The computing system is configured to: receive data to be stored in the data storage system; compute values corresponding to different respective portions of the received data; generate identifiers corresponding to different respective portions of the received data, with an identifier corresponding to a particular portion of data including the computed value corresponding to the particular portion of data and metadata indicating a location where the particular portion of data is being stored in the data storage system; store at least some of the identifiers in an index until the index reaches a predetermined size; and in response to determining that a first identifier corresponding to a first portion of data, received after the index reached the predetermined size, was not already stored in the index before the first portion of data was received, store the first identifier in the index and select at least a second identifier corresponding to a second portion of data to be removed from the index such that the index does not exceed the predetermined size.

Other aspects and advantages will be apparent from the detailed description, drawings, appendices and claims.

DESCRIPTION OF DRAWINGS

FIG. 3 is an example deduplication process.

DESCRIPTION

Figure 1A:
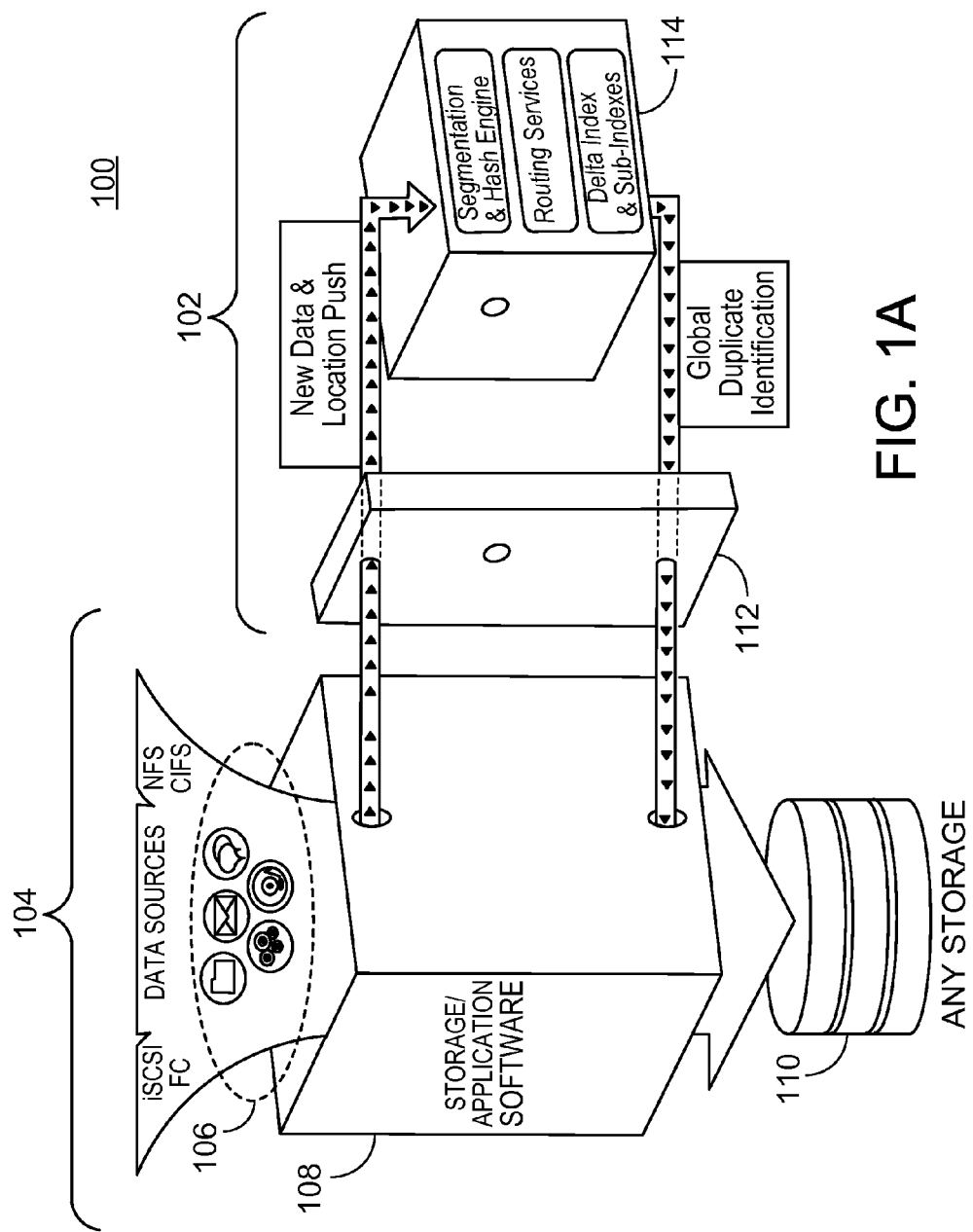
FIG. 1A is a block diagram of a system for managing stored data.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

FIG. 1 shows an exemplary system 100 for integrating a deduplication engine 102 into a data storage system 104. The data storage system 104 is configured to receive any of a variety of types of data 106 from one or more data sources. The data 106 can include, for example, different types of files from various file systems, having different data types, and/or corresponding to different applications or operating system layers (e.g., electronic mail, media files or streams, software libraries, etc.). In this example, the system 104 includes a software layer 108 running in an execution environment hosted on one or more general-purpose computers under the control of a suitable operating system. The software layer can be configured as a database, for example, or another type of application that manages stored data. The system 104 also includes one or more storage media 110 within the execution environment accessible to the software layer 108. The execution environment can include a configuration of computer systems or computer system components (e.g., coupled via a local area network (LAN) or a storage-area network (SAN)).

The deduplication engine 102 is configured to provide an optional deduplication function for use by the data storage system 104. In this example, the deduplication engine 102 provides an application programming interface (API) 112 that includes various functions that can be called from within the software layer 108 of the data storage system 104. The software layer 108 can store new data in the media 110 optionally taking into account advice returned as output of the functions of the API 112 about whether portions of the data have already been stored in the media 110, and if so where the portions are stored. In response to the deduplication advice indicating which new segments of data have duplicates that are already stored, the software layer 108 can determine whether to represent some of the new segments by referring to the previously stored duplicates instead of storing the new segments.

When deduplication advice is desired for new data, the software layer 108 provides the new data to the deduplication engine 102 by calling a function of the API 112. The function can be called at any of a variety of stages including: while the new data is being written to the media 110, or at any subsequent time as determined by the software layer 108. Along with the new data, the software layer 108 can provide other input to the function such as application-specific metadata. For example, location information can be provided that describes where the new data is located (e.g., in a temporary storage location within the media 110 or other storage media) in the system 100 or an external location. The software layer 108 is also able to improve the accuracy of the advice from the deduplication engine 102 by calling functions of the API 112 to update the index when data is deleted or modified. In some implementations, the software layer 108 may also provide a sequence number along with the application specific metadata to the function. The software layer 108 can use the sequence number to quickly verify whether or not the deduplication advice is valid. If the location information has changed since the last time the software layer 108 queried the deduplication engine 102, then the sequence number will indicate that the deduplication advice is outdated.

In some implementations, the deduplication advice can be used by a remote user or client of a data storage system 104 to determine if a data segment needs to be transmitted over a network. For example, if the data segment is a duplicate of an existing copy of the segment, then the existing copy of the segment can be referenced instead thus saving network capacity and possibly also storage capacity.

The deduplication engine 102 includes a segmentation and index management module 114 that performs various actions to handle calls to the functions of the API 112. The module 114 segments the new data into variable-length segments, optionally taking into account characteristics of the new data to determine appropriate boundaries for the segments. For example, duplicate data may occur in files having different block alignments, such as when a file appears within two ZIP archives at different locations relative to the start of the archive. Content-aware segmentation enables the embedded file to be located and deduplicated even if the file appears at different offsets in the two archives.

The module 114 computes fingerprints as identifiers corresponding to different respective segments. In some implementations, the module 114 computes hash values that uniquely identify different respective segments, and includes the entire hash value or a shorter portion of the hash value or a shorter computed value based on the hash value in the fingerprint. In some implementations, the module 114 uses SHA-256 cryptographic hashing algorithm designed by the National Security Agency to compute the hash values for the respective segments. For example, techniques for using abbreviated values for the fingerprint are described in U.S. Pat. No. 7,457,800, and U.S. Pat. No. 7,457,813, each of which is incorporated herein by reference.

In some implementations, the fingerprint also includes a domain tag representing a domain in which one or more segments are being stored and managed. For example, the domain tag can corresponds to a section of a file system in which the one or more segments are being stored, a portion of a storage medium including, for example, any of the following: a disk or disk volume (e.g., identified by a logical unit number (LUN)), a data protected set of disks, a storage device, or a cluster of storage devices). The inclusion of the domain tag in the fingerprint enables the system 100 to distinguish between different segments that may have identical content (and therefore identical hash values) but are stored in different media and/or file systems, where it may be difficult to create references to between data stored in those different media and/or file systems.

The deduplication engine 102 stores the fingerprints in an index that includes multiple entries, each entry storing one of the fingerprints. Each entry stores a reference to the segment corresponding to the fingerprint stored in the entry.

In some implementations, different data segments may need to be indexed in a same index without being deduplicated across the segments. By way of example, a service provider may have two customer volumes on a same underlying media, but data cannot be shared between volumes. To address this situation, the index may support the creation of a domain identifier or tag (e.g., a namespace) to be associated with each segment (e.g., Client1 and Client2). The data segment associated with a first domain, e.g., Client1, will not deduplicate with the data segment associated with the second domain, e.g. Client2.

When a duplicate segment is identified, a duplicate data advisory can be sent to the software layer 108. In some implementations, the advisory can be synchronously sent via a function return. In some implementations, the advisory can be asynchronously sent via a previously registered callback function. The advisory provides metadata necessary for the software layer 108 to determine the duplicate information. For example, the metadata can include a location of the duplicate data and possibly a sequence number, each corresponding to the new segment and the previously stored segment. In some examples, the software layer 108 may notify the deduplication engine 102 that the advice is outdated (e.g., based on sequence numbers described above). In such instances, the deduplicate engine 102 updates its index to remove the outdated information. In some examples, the software layer 108 can unify data extents within the file system specific to the software layer 108 based on the advice.

When a duplicate segment is identified, a reference to the segment can also be stored in a data structure that is separate from the index. In some implementations, the data storage system 104 stores a reference to the location of a duplicate segment using a data structure that is independent of the deduplication engine 102, such as a data structure in the file system inode structure of the media 110, where the data structure is able to point directly to the location the duplicate data is stored on the media 110 (e.g., a location on a disk). This can provide the advantage of the data storage system 104 being able to operate more independently of the deduplication engine 102, without the need to rely on the index to access files that include segments that are references to duplicate segments from other files or locations within the same file. In such implementations, the deduplication engine 102 does not become critical to the reliability and availability of the data storage system 104 for data retrieval.

In alternative implementations, the data storage system 104 only stores the fingerprint value for the duplicate segment. In such implementations, the data storage system 104 would have to query the deduplication engine 102 as to where the referenced segment was located, and the deduplication engine 102 would become critical to the operation of the data storage system 104.

The index is managed such that the size of the index does not exceed a predetermined maximum size. This enables the deduplication engine 102 to limit the amount of storage space required for the index. The deduplication engine 102 provides deduplication advice for data that falls within a deduplication window corresponding to the most recently "seen" segments in order of how recently they have been seen. In some implementations, the index can include an on-disk volume for recording names corresponding to the data segments. Using this on-disk volume, the deduplicate engine 102 is able to determine the deduplication window for which the engine 102 provides deduplication advice.

Referring to FIG. 1A, an example deduplication window 150 is shown. Before the index reaches the size limit, a new segment is added to the most recently seen side 160 of the deduplication window 150 when its fingerprint is stored in the index, and gradually moves to the least recently seen side 170 of the deduplication window 150 as fingerprints for additional segments are stored in the index. After the index reaches the size limit, one or more least recently seen segments are removed from the deduplication window 150 by removing its fingerprint from the index to prevent the index from exceeding the size limit when an entry with a new fingerprint is added. Before or after the index reaches the size limit, a segment whose fingerprint is already stored in the index added to the recently seen side 160 of the deduplication window 150 when it is seen again, for example, by updating its fingerprint in the index.

Figure 1B:
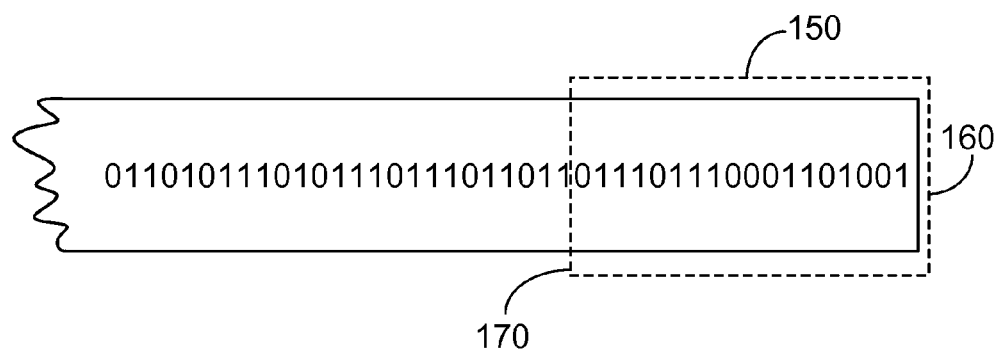
FIG. 1B is an example deduplication window.

Referring to FIG. 1B, an example index record is shown. For example, the index record 175 can include a key portion 178 and a value portion 180, each of a predetermined length (e.g., 32 bytes each for a total of 64 bytes). In some implementations, the key portion 178 can include a key representing a result of a hash function operating on the contents of a data segment. For example, the hash function can be based on the SHA-256 cryptographic hash described above. In some examples, the key can include the hash value in combination with a domain identifier (e.g., a namespace). For example, the hash value and the domain identifier can be combined based on one of the following expressions:

Key=XOR(hash,SHA256(domain identifier))

Key=SHA256(hash,domain identifier)

In some implementations, the value portion 180 can be application-provided metadata describing a data segment. For example, the value portion 180 can include an address in the storage medium corresponding to a location where the data segment is stored. In some examples, the value portion 180 can also include other metadata, such as, a sequence number and/or a transaction identifier, which may be used to validate the deduplication advice.

In some implementations, when the index reaches a predetermined size, a batch of data records representing the fingerprints (e.g., millions of records) may be marked as being discardable. These records may then be purged from the index at a time that is convenient. For example, the records can be purged as part of an operation involving data that may be in a proximity of the data marked as being discardable.

In some implementations, a segment is considered "seen" when one of three events has occurred:
 a new segment has been provided to the module 114 with a fingerprint that is not currently stored in the index;
 a new segment has been provided to the module 114 with a fingerprint that is currently stored in the index;
 a segment that is currently stored in the index has been explicitly updated using an update function (e.g., to ensure that the segment will not be removed from the index).

The deduplication window 150 can be managed by storing index entries in order of how recently the segments corresponding to the fingerprints have been seen as new data is received. Alternatively, if deduplication is being performed for data that has already been stored in the data storage system 104, the module 114 can analyze timestamps associated with different portions of data (indicating when those portions of data were stored) to determine an order associated with the segments in the deduplication window 150 and the corresponding index entries.

The module 114 can be configured to perform other functions associated with managing the index and providing deduplication advice for the segments (e.g., as described in the exemplary embodiments of the attached appendices).

Figure 1C:
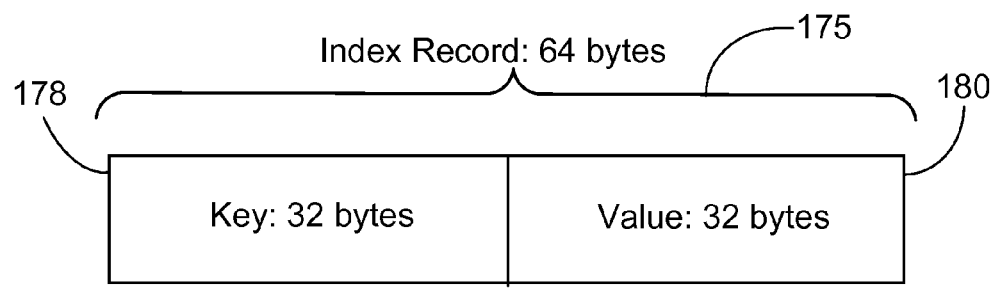
FIG. 1C is an example index record.
Figure 1D:
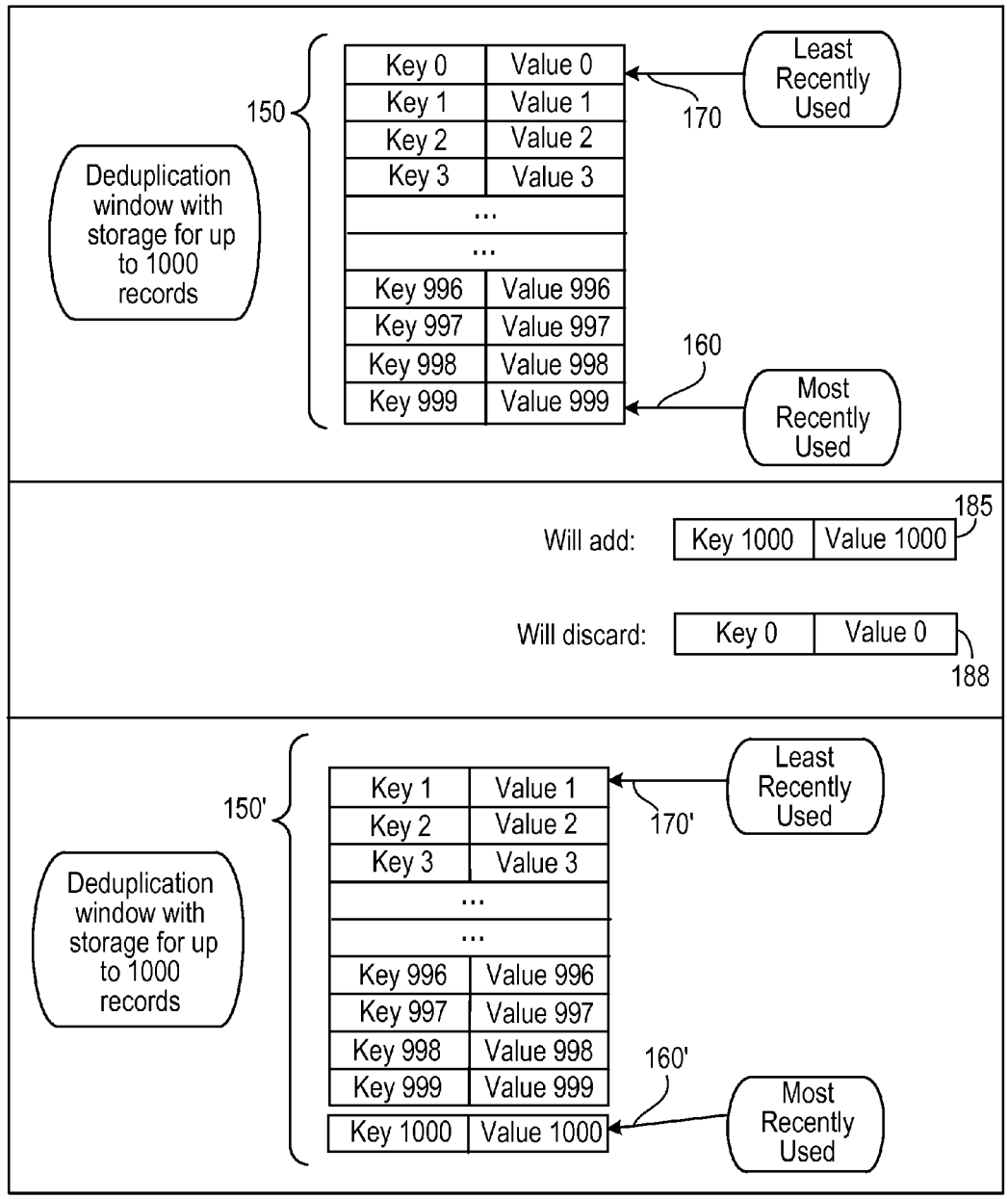
FIGS. 1D-E are example deduplication window operations.
Figure 1E:
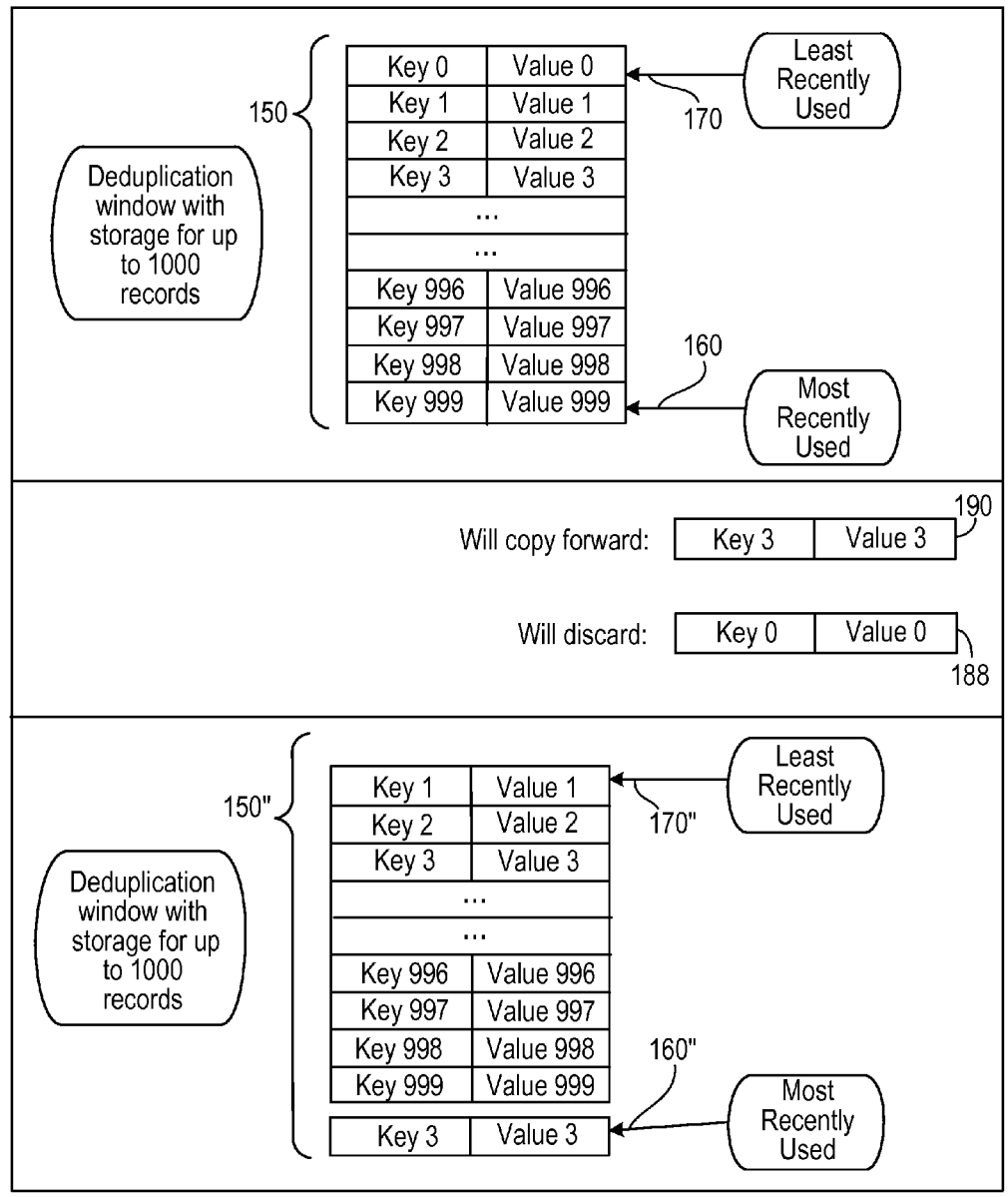

FIGS. 1C-D depict a detailed diagrammatic representation of the deduplication window 150. Referring to FIG. 1C, the window 150 has a predetermined capacity, e.g., in this case 1000 index records. As shown, the key 999 and value 999 index record is at the most recently used end 160 of the window 150. The key 0 and value 0 index record is at the least recently used end 170 of the window 150. In an implementation, the window 150 is full, i.e., there are 1000 records in the index and no room for more.

In an implementation, a process for adding a new unique record 185, i.e., a record that does not already exist in the window 150, is shown. The unique record 185 has key 1000 and value 1000 and is added to the most recently used end 160. As such, an updated most recently used end 160' is shown. To make room for the new unique record 185 an older record 188 is removed from the window 150. For example, the older record 188 is at the least recently used end 170 of the window 150. As such, an updated least recently used end 170' is shown.

Referring now to FIG. 1D, a deduplication window operation can be carried out where a previous record in the window 150 is updated. For example, the software layer 108 may look up the window 150 for a record with key 3 and value 3, e.g., record 190. Such an operation involves adding a new copy of the record 190. The new record 190 can be added to the most recently used end 160. As such, an updated most recently used end 160" is shown. To make room for the new copy of the record 190, an older record 188 is removed from the window 150 as before. For example, the older record 188 is at the least recently used end 170 of the window 150. As such, an updated least recently used end 170" is shown.

The deduplication engine 102 can be integrated as an inline, parallel, or post-process solution depending on the structure and requirements of the software later 108.

In some implementations, the deduplication engine 102 can be configured to operate outside of the data read path. In some implementations, the deduplication engine 102 can also be configured to not write or alter data written to the storage medium 110. As discussed above, the deduplication engine 102 provides deduplication advice to the software layer 108, which in turn decides how to process the data based on the advice. In this manner, the data on the storage medium 110 is protected against data corruption.

As an inline solution, the deduplication engine 102 can process incoming data segments in real-time. For example, some applications in the software layer 108 can benefit from immediate data optimization and for which a latency can be masked by parallelism and write caching. In this implementation, the deduplication engine 102 may be configured to intercept the write path to determine if data is duplicate, and then pass advice to the software layer 108.

As a parallel solution, the deduplication engine 102 can be configured to receive a copy of the data as it is written to storage medium 110. In this manner, write latency can be avoided. If a duplicate segment is identified, the software layer 108 can respond to deduplication advice by asynchronously pushing an update to the storage medium 110.

As a post-processing solution, the deduplication engine 102 can be configured to receive data back from storage medium 110, either on demand or on a fixed schedule. The deduplication device 102 can provide deduplication advice to the software layer 108, which then can push updates to the storage medium 110.

The deduplication engine 102 can be deployed as an embedded process within the software layer 102, including a set of libraries, which is enabled to provide support to any application within the software layer 102. In some implementations, the deduplication engine 102 can be deployed in a "grid" configuration, which would allow distributed clients anywhere on a network to share a same deduplication index. In such implementations, for example, the deduplication engine 102 can use a plurality of servers so the deduplication load is distributed rather than concentrated on a single server. In such a scheme, multiple client systems can create index sessions by connecting to the shared deduplication engine 102. In some implementations, in order to deduplicate data between clients systems, each client system can connect to a same set of servers.

Figure 2:
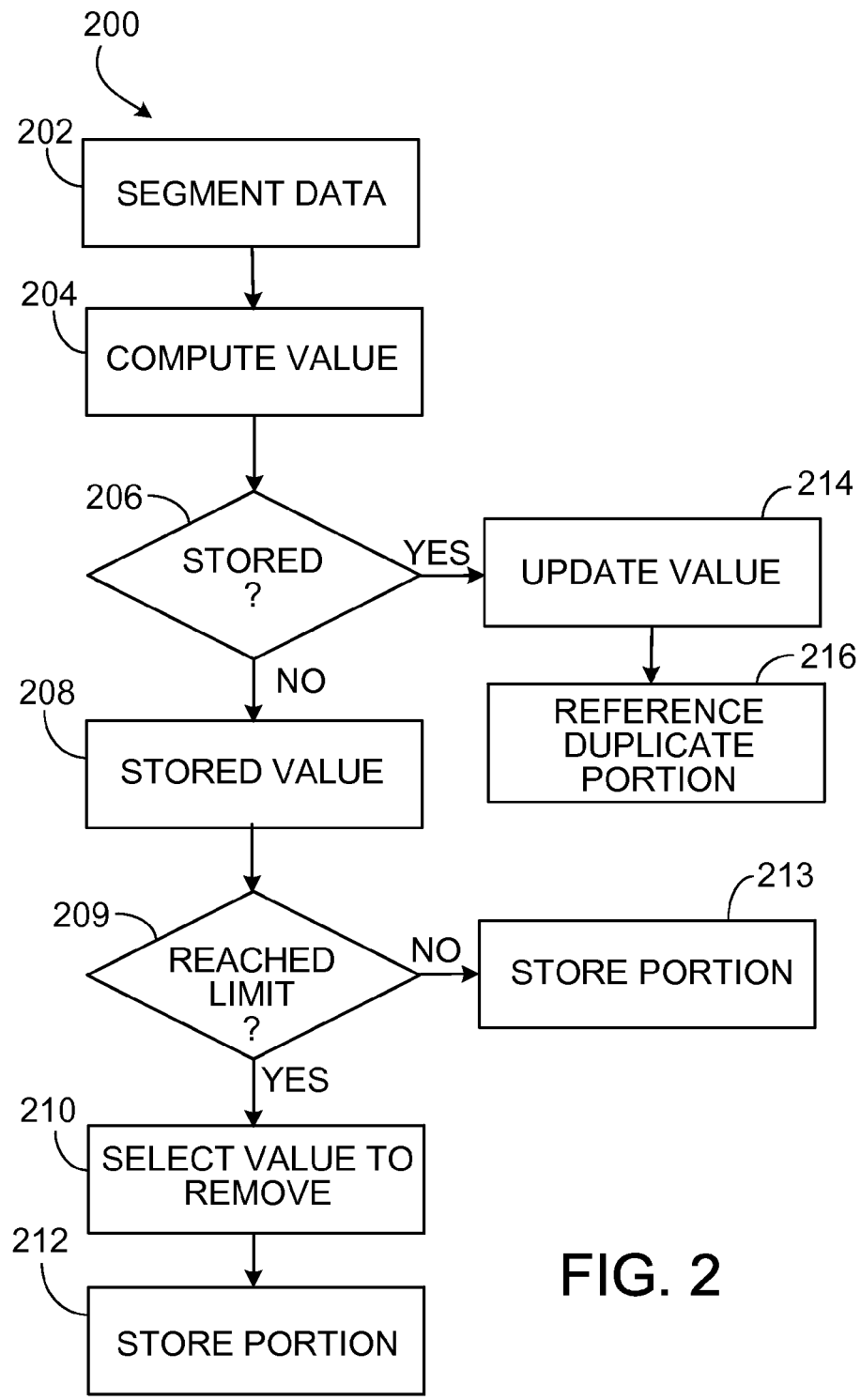
FIG. 2 is a flowchart of an exemplary data storage procedure.

FIG. 2 shows a flowchart for an exemplary deduplication procedure 200. The procedure 200 includes segmenting (202) received data into different respective portions. The procedure 200 includes computing (204) values corresponding to the different respective portions of the received data. At least some of the identifiers are stored in an index. The storing includes determining (206) whether a first identifier corresponding to a first portion of data was already stored in the index before the first portion of data was received. In response to determining that a first identifier, corresponding to a first portion of data, was not already stored in the index before the first portion of data was received, the first identifier is stored (208) in the index. If the first portion of data was received after determining (209) that the index has reached the predetermined size the procedure 200 also includes selecting (210) at least a second identifier corresponding to a second portion of data to be removed from the index such that the index does not exceed the predetermined size (e.g., based at least in part on an order in which identifiers were added to or updated in the index). The procedure 200 stores (212, 213) the first portion of data in the data storage system 104, if it was not already stored, whether or not the index has reached the limit. In response to determining that the first identifier was already stored in the index before the first portion of data was received, the first identifier is updated (214) in the index, and a data structure representing data that included the first portion of data references (216) a duplicate of the first portion of data that was already stored in the data storage system before the third portion of data was received.

In some implementations, features of the deduplication index can be developed using an application programming interface (API). For example, the API may include parameters relating to an upper limit of memory, e.g., quantified in gigabytes, to be used by the index, a number of bytes to be designated for each data segment for representing metadata (e.g., up to 32 bytes), and a maximum data segment size.

Along these lines, an example API is described below. It should be understood that there may be many ways of implementing the API, and the following is for illustration only. The API described below enables the creation of a deduplication index in an embedded deduplication engine.

A "UdsConfiguration" object can be created to specify parameters of the index being initialized:
UdsConfiguration config;
udsInitializeConfiguration(&config, memGB,
  sizeof(struct my_metadata), 4096);

The configuration parameters can then be used to create the index as follows:
UdsIndexSession indexSession;
udsCreateLocalIndex(path, config, &indexSession);

The path variable can be, for example, a path to a directory where a local index will write its data files.

The indexSession variable can be used to create deduplication contexts as described in detail below. The index session defined as described above is thread-safe, i.e., the API may make calls to the session in multiple threads. In some implementations, each context can be associated with a single domain corresponding to a single deduplication domain. For example, the data segments that are indexed in this manner and associated with a same domain will deduplicate against each other. Further, in examples, data segments associated with contexts corresponding to different domains will not deduplicate against each other.

In some implementations, each context can also represent a specific index type, e.g., a Block index, a Stream index, or a File index. A same index type may be used for all contexts associated with any given domain.

The API for a Block index can support deduplication at a granularity of client-defined chunks of data, but without (or with limited) content awareness. For example, the Block API may allow the software layer 108 to specify the data segments to be indexed for deduplication. As such, when the deduplication engine 102 recognizes identical data segments it may synchronously or asynchronously respond with the location of the canonical copy.

The APIs for Stream and File indices can support content-aware segmentation on file types such as Microsoft Office, PDF, ZIP, tar, and Microsoft Hyper-V images (VHD). Stream and File index may need additional processing within the software layer 108. For example, the software layer 108 may need variable-sized extent unification.

In some implementations, to create a Block type context, an example API can be configured to support the following definitions:
UdsBlockContext blockContext;
udsOpenBlockContext(session, namespace, &blockContext);

In some implementations, to create a Stream type context, an example API can be configured to support the following definitions:
UdsStreamContext streamContext;
udsOpenStreamContext(session, namespace, &streamContext);

In some implementations, to create a File type API, an example API can be configured to support the following definitions:
UdsFileContext fileContext;
udsOpenFileContext(session, namespace, &fileContext);

In some implementations, upon receiving deduplication advice from the deduplication engine 102, the software layer 108 may save space by unifying duplicate and data segments. In some situations, the software layer 108 may not perform such unifying. Such situations can include, for example, when contents of the data's canonical location has been modified or deleted. As such, that location may no longer contain an exact copy of the new data segment. In another situation, the canonical location of the data can be unchanged, but the new data segment may have been updated between the time it was posted and the time a response was asynchronously received from the deduplication engine 102. In some examples, the reference count (e.g., sequence number) of the data segment canonical location may be at its maximum and can no longer accept new incoming references.

An example mechanism by which the APIs may facilitation communication with the deduplication engine 102 is described as follows. An example block API is used below to describe the process. In some implementations, the block API can allow the software layer 108 to provide information to the deduplication engine 102 synchronously via a function called, for example udsIndexBlock, or asynchronously via a function called, for example, udsPostBlock, which uses a callback to return results. In example implementations involving the synchronous variant, udsIndexBlock may have the following signature:
int udsIndexBlock(UdsBlockContext context,
const UdsBlockAddress blockAddress,
size_t dataLength,
const void *data,
bool *hashExists,
UdsBlockAddress *canonicalBlockAddress,
UdsChunkName **blockName);

In the above snippet, the first argument context is a Block API handle corresponding to the deduplication engine 102 library. The second argument, UdsBlockAddress, is metadata defined by the software layer 108 that describes the block.

In some implementations, a size of the metadata (e.g., up to 32 bytes) can be specified when the index is created. Also, in some situations, information may be provided that uniquely describes the block. For example, such information may be a logical unit number (LUN) and/or a logical block address, a file inode and an offset into the file).

In some examples, the calling application in the software layer 108 can also provide a length of the data segment and a pointer to the data itself. When the function returns, the deduplication engine 102 can use a variable hashExists to indicate if the block has been seen before or not. The deduplication engine 102 can also provide the address of a canonical segment. If the segment is recognized as a duplicate, the canonical segment address is the previously stored metadata for the segment. Optionally, the calling application may also provide a buffer to hold the segment's UdsBlockName.

The following example demonstrates using the Block API to detect duplicate lines in a text file:
```
int main(int argc, char **argv)
{
char line[MAX_LINE_LEN];
int lineNo=0;
UdsConfiguration config;
udsInitializeConfiguration(&config, 1, sizeof(int), 0);
UdsIndexSession session;
udsCreateLocalIndex("/tmp/example-index", config, &session);
udsFreeConfiguration(config);
UdsBlockContext context;
udsOpenBlockContext(session, NULL, &context);
UdsBlockAddress prevNo;
while (fgets(line, MAX_LINE_LEN, stdin)!=NULL){
bool hashExists;
int lineLen=strlen(line);
udsIndexBlock(context, &lineNo, lineLen, line,
&hashExists, &prevNo, NULL);
if (hashExists) {
int *lastLine=prevNo;
printf("D[%d]\n", *lastLine);
free(lastLine);
} else {
printf("N % s", line);
}
lineNo++;
}
udsCloseBlockContext(context);
udsCloseIndexSession(session);
return 0;
}
```

This snippet example above begins by configuring and creating a new local index, making a session to it, and opening a UdsBlockContext over the session to the new index (in a default domain). In some implementations, next, the snippet can read lines of the input and index them to the deduplication index (along with the line number where the line was seen). If the text has never been seen before, the snippet can print the line, otherwise the snippet prints the line number where the text was first encountered.

The asynchronous variant may be invoked by calling udsPostBlock instead of udsIndexBlock. In some implementations, the results can delivered in a separate thread via an asynchronous callback. An example function and its callback may be defined as follows:
int udsPostBlock(UdsBlockContext context,
UdsCookie cookie,
const UdsBlockAddress blockAddress,
size_t dataLength,
const void *data);
typedef void (*UdsDedupeBlockCallback)
(UdsBlockContext context,
UdsQueryType type,
int status,
UdsCookie cookie,
UdsBlockAddress duplicateAddress,
UdsBlockAddress canonicalAddress,
UdsChunkName *blockName,
size_t blockLength,
void *callbackArgument);

In some examples, the arguments to the synchronous and asynchronous interfaces may be the same. In some examples, a difference between the two types of interfaces can involve a type called UdsCookie. As with UdsBlockAddress, this type may be entirely abstract and defined by the software layer

108. Unlike UdsBlockAddress, however, UdsCookie is not stored in the index. Instead, the Application Software uses UdsCookie to provide the callback thread with context for handling deduplication advice. In some implementations, the deduplication engine 102 may not deliver the callbacks in the order in which they were posted. To ensure that all outstanding callbacks have been delivered, the software layer 108 can call function udsFlushBlockContext.

When the duplicate data segment no longer matches the previously stored data segment, the duplicate advice is deemed stale. To prevent data corruption, the software layer 108 does not apply the stale advice. An example of validating advice is to read the new data segment and compare it with the data segment stored in the storage medium 110. If the contents match, the storage locations may be unified. Alternatively, the storage system can include a sequence number with the storage location metadata and use the sequence number to detect modifications.

In some implementations, the software layer 108 can store hash information associated with the data segment with the data segment. In this case the application may only need to compare the hashes instead of comparing the actual data.

Referring to FIG. 3, an example file system 300 using sequence (or generation) numbers is shown. As shown, each inode in the file system can be associated with two additional pieces of metadata: a dirty-bit, which indicates whether or not the file has been scanned for deduplication since its last modification, and a sequence field (typically a 64-bit integer) that tracks file modifications. At time T=1 (labeled 310), a file "/foo" is stored at inode #1 of the file system. The dirty-bit is set to "Yes" to indicate that the file has not been scanned by the deduplication engine 102. Further, the sequence number for the file is set to 1. At time T=2 (labeled 310), the file "/foo" is scanned by the deduplication engine 102, setting the dirty=bit to "No". The sequence number remains unchanged as the data is not altered by this process. At time T=3 (labeled 330), another file "/bar" is scanned by the deduplication engine 102. As shown, the deduplication advice indicates that the file "/bar" shares a "chunk", i.e., data segment, with the file "/foo" at inode #1 having a sequence number of 1. Since the sequence numbers are the same, the advice may be acted on by the software layer 108.

At time T=3 (labeled 340), the file "/foo" may be updated. This newly updated file has not been scanned by the deduplication engine 102 and as such the dirty-bit is set to "Yes". Further, since the file has been updated, a new sequence number of 2 is assigned. At time T=4 (labeled 350), a new file "/baz" is scanned by the deduplication engine 102, which reports that the file shares a data segment with the file "/foo" at the inode #1 with sequence number 1. However, since the sequence number of the file "/foo" at inode #1 is now 2, the advice is deemed stale. In this manner, the software layer 108 may not act upon the advice, and may instead perform other actions. For example, the software layer 108 may perform data comparison operations or update the file mappings. Subsequently, at time T=5 (labeled 360), the file "/foo" is rescanned by the deduplication engine 102, thus setting the dirty-bit to "No".

By including the sequence of the file in the data segment metadata (i.e., along with the inode number), deduplication advice is returned that indicates whether or not the file was modified since it was previously indexed. For files that are infrequently modified but are commonly duplicated (i.e., fixed-content), this mechanism may help avoid extra disk-reads when processing deduplication advice.

Figure 4A:
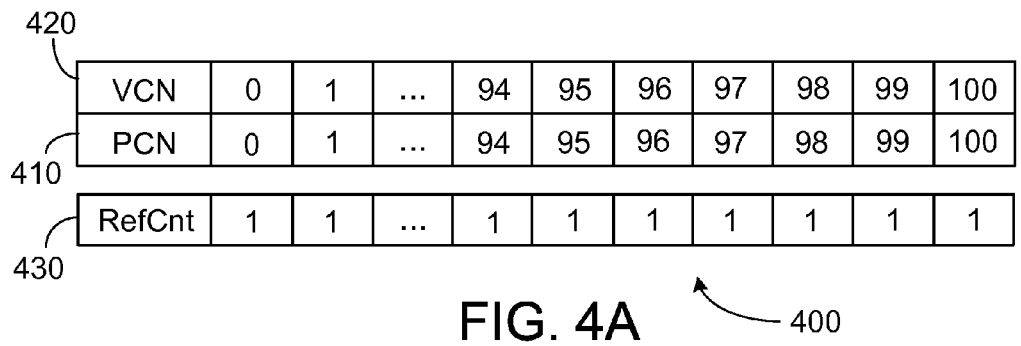
FIGS. 4A-C is an example logical unit implementation showing different abstraction levels for using deduplication advice.
Figure 4B:
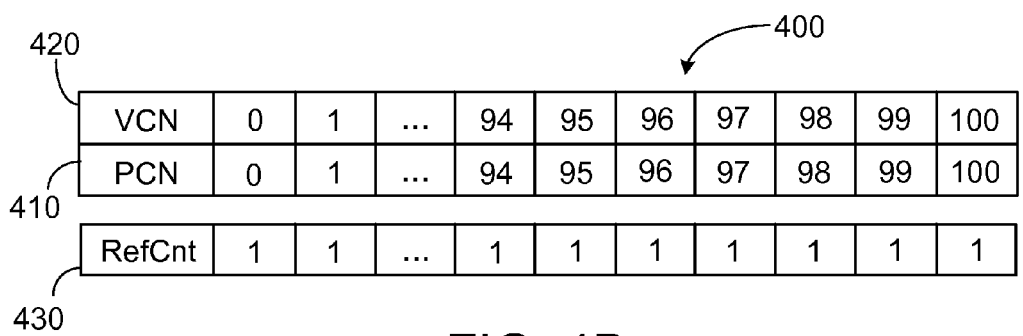
Figure 4C:
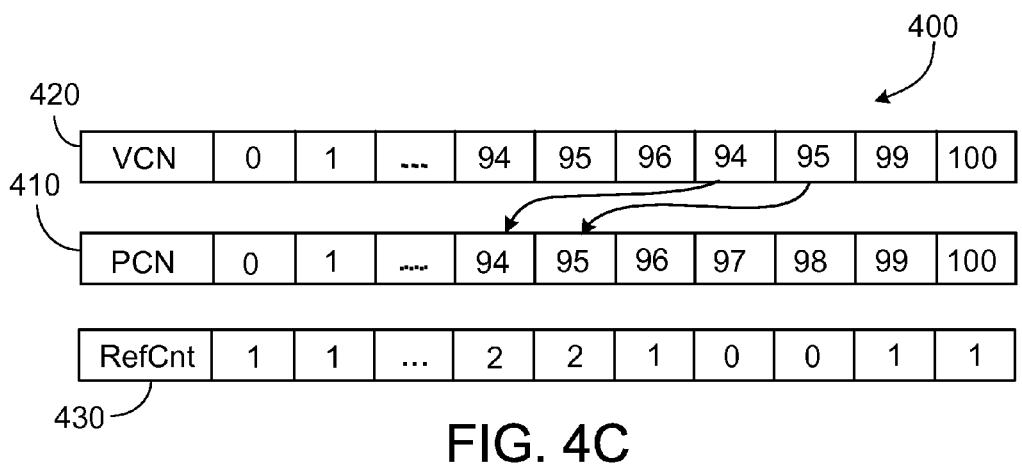

Referring to FIGS. 4A-C, a logical unit 400 implementing deduplication advice is shown. In some implementations, the deduplication engine 102 provides a mechanism for a storage medium to identify identical data segments within the logical unit (identified by a logical unit number or LUN). In some examples, the mechanism described below may allow for the medium to reclaim the space occupied by the duplicate segments for storing additional data. For example, the data segments may be reallocated as part of a system for volume extension.

In some situations, an example deduplication API can use two user-defined data structures for performing deduplication. For example, the data structures may store block addresses (represented by UdsBlockAddress) and callback data (represented by UdsCookie). The data structures can identify abstractions of the storage system. For instance, in a file system, the abstractions can be "block numbers" and the higher-level inodes that are referred to specific blocks. Within a logical unit, the abstractions can be "physical" segment numbers (which may themselves be further virtualized) and a higher level virtualization of those physical segments. For example, the physical segment numbers may be based on physical memory addresses and virtual segment numbers may be based on a higher level virtualization of the physical segments. As such, virtual memory addresses may be assigned to the virtual segments.

As such, physical segment numbers or physical chunk numbers (PCNs) 410 are the content of the UdsBlockAddress abstract data type, and virtual segment numbers or virtual chunk numbers (VCNs) 420 are the content of the UdsCookie abstract data type.

In an example scenario, consider that the logical unit 400 has one-to-one mapping between the PCN 410 and VCN 420. In this example scenario the logical unit 400 is assumed to contain no duplicate data.

The row labeled reference count "RefCnt" 430 counts a number of references for a particular PCN. When a logical unit is not using deduplication, the reference counts will either be zero or one.

Referring to FIG. 4B, in an example scenario, the virtual segments 97 and 98 may be updated so that their contents are substantially identical to the contents of virtual segments 94 and 95. When segments 97 and 98 are updated and rewritten to the storage, the storage system uses the udsPostBlock API call to provide the VCN, PCN, and data segment information for the updated segments. When the duplicate data is identified, the deduplication engine 102 may invoke a previously registered callback (e.g., udsRegisterDedupeBlockCallback) to provide the VCN and PCN of the duplicate block, along with the PCN of canonical location for that block. For example, after being notified of the update to VCN 97, mapped to PCN 97, the deduplication engine 102 can invoke the callback advising that VCN 97, currently mapped to PCN 97, should be remapped to point at PCN 94.

FIG. 4C shows the resulting state of logical unit 400 after the deduplication advice has been processed and the VCNs have been remapped. VCNs 94 and 97 are both mapped to share physical chunk 94, and VCNs 95 and 98 are both sharing physical chunk 95. The reference counts have also been updated to reflect this new mapping. In the process, physical chunks 97 and 98 are now unused. In addition to the scenarios described above in which deduplication advice can be implemented, other applications can include "copy on write" techniques and methods for extending a size of a logical unit.

Figure 5A:
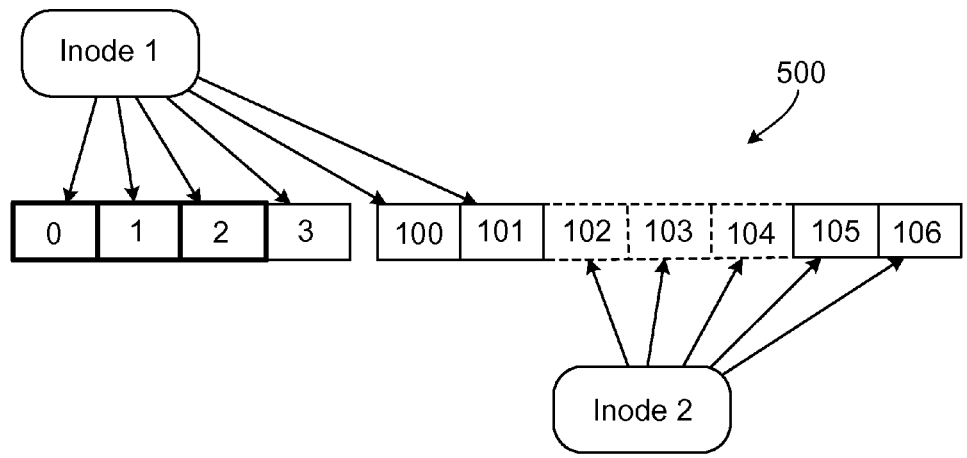
FIGS. 5A-B is an example file system using deduplication advice.
Figure 5B:
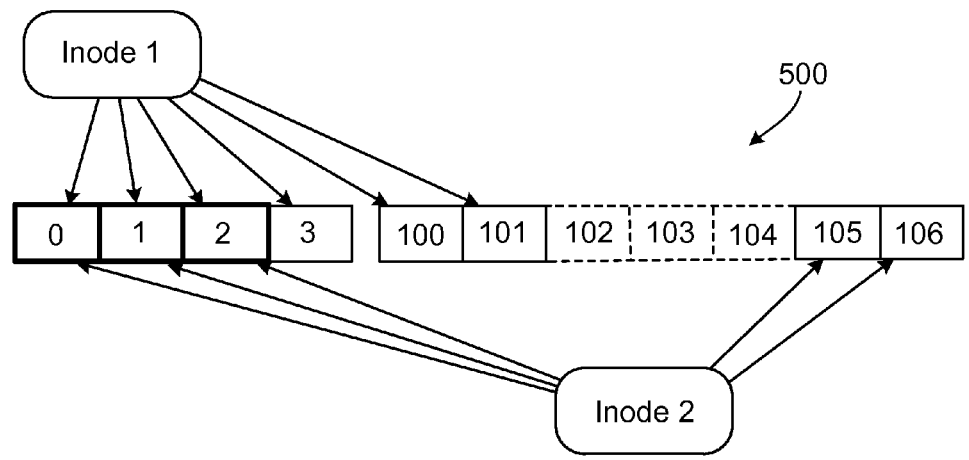

FIGS. 5A-C show an example scenario for implementing deduplication advice in a file system 500. In general, some storage systems can use a data segment (called "blocks") as their fundamental unit of storage allocation. In applications, segments may range in size from as little as 512 bytes to as large as 1 MB. To deduplicate block-based storage, in some examples, the deduplication engine 102 can identify blocks that contain the same data and implement references to those data-blocks to share storage. In this manner, while the data remains the same, only one copy of the data segment is needed.

FIG. 5A shows two inodes 510, 520 referencing blocks on a file system 500. As shown, the two inodes 510, 520 share same data segments (shaded). That is, segments 0, 1, and 2 are substantially identical to segments 102, 103, and 104.

The software layer 108 can deduplicate the data referenced by the inodes 510, 520 as long as it can reference the segments and provide the segments to the deduplication engine 102. For example, the software layer 108 may determine how to reference the software layer's 108 data storage elements.

In an example implementation, a segment reference can be identified with three items: an inode number, an index of the link (e.g., the third arrow of inode 1), and a sequence number for the link. Such a data structure may be packaged up as an instance of UdsCookie. In an example implementation, the segments can be identified by a segment number (e.g., number 104), and a sequence number for the segment. Such a data structure can constitute an instance of UdsBlockAddress.

As the software layer 108 stores the segments to the storage medium, the file system may call udsPostBlock with the link, the segment address, and the segment data. The deduplication engine 102 may compute the segment's signature and determines whether the segment has been indexed. If the segment is unknown it is stored in the index. Otherwise the deduplication engine 102 can use the UdsDedupeBlockCallback to inform the file system 500 that the link may be re-pointed at another segment having the same contents. The file system 500 may then free the unreferenced segment. The deduplication engine 102 can create new index entries in response to calls to udsPostBlock in connection with Inode 1.

In some examples, the deduplication engine 102 may generate duplicate data advisories to inform the file system 500 that the segment may be deduplicated with an existing copy elsewhere in response to calls to udsPostBlock when processing inode 2. In this regard, referring now to FIG. 5B, the result after inode 2 is processed is shown. The first 3 block references of Inode 2 are pointed at blocks zero through two, allowing blocks 102 through 104 to be freed.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method for managing data in a data storage system, the method comprising:
   receiving, at a data deduplication engine associated with the data storage system, data to be stored in the data storage system; and
   providing, by the data deduplication engine, deduplication advice to a software layer based on real-time analysis of the received data by:
      computing values corresponding to different respective portions of the received data;
      generating identifiers corresponding to different respective portions of the received data, with an identifier corresponding to a particular portion of data including the computed value corresponding to the particular portion of data and accompanying metadata associated with the particular portion of data;
      storing at least some of the identifiers in an index of a predetermined size; and
      in response to determining that a first identifier corresponding to a first portion of the received data was not already stored in the index before the first portion of data was received, indicating, as the deduplication advice provided before the first portion of the received data is stored in the data storage system, that the first identifier may be stored in the index and the first portion of the received data may be stored in the data storage system; and
   designating one or more identifiers for removal from the index, at least some of the identifiers being among those that have been least recently added to or updated in the index.

2. The method of claim 1, further comprising, designating for removal at least a second identifier corresponding to a second portion of data to be removed from the index such that the index does not exceed the predetermined size.

3. The method of claim 2, wherein designating for removal at least a second identifier from the index comprises designating for removal one or more identifiers based at least in part on an order in which identifiers were added to or updated in the index.

4. The method of claim 1, further comprising receiving an indication that an identifier corresponding to one of the respective portions of the received data was previously stored in the index, and, in response, verifying that the indicated identifier still corresponds to the one of the respective portions of data.

5. The method of claim 1, wherein the data deduplication engine is an embedded module including a set of libraries within the software layer.

6. The method of claim 1, further comprising:
   determining a first domain corresponding to a first one or more respective portions of the data being stored in the data storage system and a second domain corresponding to a second, different one or more respective portion of the data being stored in the data storage system.

7. The method of claim 6, further comprising:
   executing deduplication for data segments of the received data such that data segments belonging to the first domain is not deduplicated with data segments belong to the second domain.

8. The method of claim 1, wherein the data deduplication engine can be shared by and among a plurality of clients on a network.

9. The method of claim 8, wherein one or more of the plurality of clients create corresponding one or more index sessions by connecting to the data deduplication engine.

10. The method of claim 8, wherein, in order to deduplicate data between one or more of the plurality of clients, each of the one or more of the plurality of clients connect to a same set of servers.

11. The method of claim 1, wherein the data deduplication engine is implemented across a plurality of servers.

12. The method of claim 1, further comprising, in response to determining that a third identifier corresponding to a third portion of the received data was already stored in the index before the third portion of data was received, updating the third identifier in the index.

13. The method of claim 12, wherein updating the third identifier in the index comprises updating an order of the third identifier relative to other identifiers in the index.

14. The method of claim 12, further comprising, in response to determining that the third identifier was already stored in the index before the third portion of data was received, associating a first data structure representing data that included the third portion of data with a duplicate of the third portion of data that was already stored in the data storage system before the third portion of data was received.

15. The method of claim 14, wherein associating the first data structure with the duplicate of the third portion of data comprises storing a reference to the duplicate of the third portion of data in a data structure that is separate from the index.

16. The method of claim 1, wherein real-time analysis of the received data comprises, at the data deduplication engine, intercepting the received data before the data is stored in the data storage system and analyzing the intercepted data.

17. The method of claim 1, wherein computing values corresponding to different respective portions of the received data comprises:
   computing unique values that uniquely identify different respective portions of the received data; and
   using at least part of a unique value that uniquely identifies a particular portion of the received data as the computed value corresponding to the particular portion of the received data.

18. The method of claim 1, wherein the data storage system further comprises an application that manages data stored in the one or more storage media.

19. A method for managing data in a data storage system, the method comprising:
   receiving, at substantially the same time, data to be stored in the data storage system at both the data storage system and a data deduplication engine associated with the data storage system; and
   providing, by the data deduplication engine, deduplication advice to a software layer based on analysis of the data received at the data deduplication engine by:
      computing values corresponding to different respective portions of the data received at the data deduplication engine;
      generating identifiers corresponding to different respective portions of the data received at the data deduplication engine, with an identifier corresponding to a particular portion of the data including the computed value corresponding to the particular portion of data and accompanying metadata associated with the particular portion of data;
      storing at least some of the identifiers in an index of a predetermined size; and
      in response to determining that a first identifier corresponding to a first portion of the data received at the data deduplication engine was already stored in the index before the first portion was received, indicating, as the deduplication advice, the removal of the first identifier from the index and that the data storage system is be to asynchronously updated to remove the corresponding first portion of the data stored in the data storage system; and
   designating one or more identifiers for removal from the index, at least some of the identifiers being among those that have been least recently added to or updated in the index.

20. The method of claim 19, further comprising:
   designating for removal at least a second identifier corresponding to a second portion of data to be removed from the index such that the index does not exceed the predetermined size.

21. The method of claim 20, wherein designating for removal at least a second identifier from the index comprises designating for removal one or more identifiers based at least in part on an order in which identifiers were added to or updated in the index.

22. The method of claim 19, further comprising:
   receiving an indication that an identifier corresponding to one of the respective portions of the data received at the data deduplication engine was previously stored in the index, and, in response, verifying that the indicated identifier still corresponds to the one of the respective portions of data.

23. The method of claim 19, further comprising:
   determining a first domain corresponding to a first one or more respective portions of the data being stored in the data storage system and a second domain corresponding to a second, different one or more respective portion of the data being stored in the data storage system.

24. The method of claim 23, further comprising:
   executing deduplication for data segments of the data being stored in the data storage system such that data segments belonging to the first domain is not deduplicated with data segments belong to the second domain.

25. The method of claim 19, further comprising, in response to determining that a third identifier corresponding to a third portion of data received at the data deduplication engine was already stored in the index before the third portion of data was received, updating the third identifier in the index.

26. The method of claim 25, wherein updating the third identifier in the index comprises updating an order of the third identifier relative to other identifiers in the index.

27. The method of claim 19, wherein computing values corresponding to different respective portions of the received data comprises:
   computing unique values that uniquely identify different respective portions of the received data; and
   using at least part of a unique value that uniquely identifies a particular portion of the received data as the computed value corresponding to the particular portion of the received data.

28. The method of claim 19, wherein the data storage system further comprises an application that manages data stored in the one or more storage media.

29. A method for managing data in a data storage system, the method comprising:
   receiving, at a data deduplication engine, data stored in the data storage system;

providing, by the data deduplication engine, deduplication advice to a software layer based on analysis of the received data by:
- computing values corresponding to different respective portions of the received data;
- generating identifiers corresponding to different respective portions of the received data, with an identifier corresponding to a particular portion of the data including the computed value corresponding to the particular portion of data and accompanying metadata associated with the particular portion of data;
- storing at least some of the identifiers in an index of a predetermined size; and
  - in response to determining that a first identifier corresponding to a first portion of the received data was already stored in the index before the first portion of the received data was received, indicating, as the deduplication advice, the removal of the first identifier from the index and that the data storage system is be to asynchronously updated to remove the corresponding first portion of the data stored in the data storage system; and
- designating one or more identifiers for removal from the index, at least some of the identifiers being among those that have been least recently added to or updated in the index.

30. The method of claim 29, further comprising receiving data from the data storage system on an on-demand basis.

31. The method of claim 29, further comprising receiving data from the data storage system on a predetermined schedule.

32. The method of claim 29, further comprising:
designating for removal at least a second identifier corresponding to a second portion of data to be removed from the index such that the index does not exceed the predetermined size.

33. The method of claim 32, wherein designating for removal at least a second identifier from the index comprises designating for removal one or more identifiers based at least in part on an order in which identifiers were added to or updated in the index.

34. The method of claim 29, further comprising:
receiving an indication that an identifier corresponding to one of the respective portions of the received data was previously stored in the index, and, in response, verifying that the indicated identifier still corresponds to the one of the respective portions of data.

35. The method of claim 34, further comprising:
executing deduplication for data segments of the data being stored in the data storage system such that data segments belonging to the first domain is not deduplicated with data segments belong to the second domain.

36. The method of claim 29, further comprising:
determining a first domain corresponding to a first one or more respective portions of the data being stored in the data storage system and a second domain corresponding to a second, different one or more respective portion of the data being stored in the data storage system.

37. The method of claim 29, further comprising, in response to determining that a third identifier corresponding to a third portion of the received data was already stored in the index before the third portion of data was received, updating the third identifier in the index.

38. The method of claim 37, wherein updating the third identifier in the index comprises updating an order of the third identifier relative to other identifiers in the index.

39. The method of claim 29, wherein computing values corresponding to different respective portions of the received data comprises:
- computing unique values that uniquely identify different respective portions of the received data; and
- using at least part of a unique value that uniquely identifies a particular portion of the received data as the computed value corresponding to the particular portion of the received data.

40. The method of claim 29, wherein the data storage system further comprises an application that manages data stored in the one or more storage media.

* * * * *